United States Patent
Sun et al.

(10) Patent No.: US 11,720,150 B2
(45) Date of Patent: Aug. 8, 2023

(54) FOLDABLE ELECTRONIC DEVICE WITH MULTI-STEP ADJUSTING BRACKET

(71) Applicant: Acer Incorporated, New Taipei (TW)

(72) Inventors: Hui-Ping Sun, New Taipei (TW);
Chun-Hung Wen, New Taipei (TW);
Yen-Chou Chueh, New Taipei (TW);
Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/824,864

(22) Filed: May 25, 2022

(65) Prior Publication Data
US 2023/0195175 A1 Jun. 22, 2023

(30) Foreign Application Priority Data
Dec. 21, 2021 (TW) ................. 110147890

(51) Int. Cl.
*G06F 1/16* (2006.01)
*H04M 1/02* (2006.01)

(52) U.S. Cl.
CPC ............ *G06F 1/166* (2013.01); *G06F 1/1607* (2013.01); *G06F 1/1615* (2013.01); *G06F 1/1616* (2013.01); *G06F 1/1618* (2013.01); *H04M 1/0206* (2013.01); *G06F 1/1643* (2013.01)

(58) Field of Classification Search
CPC .... G06F 1/1615; G06F 1/1616; G06F 1/1618; G06F 1/1624; G06F 1/166; G06F 1/1607; G06F 1/1643; H04M 1/0206
See application file for complete search history.

(56) References Cited

U.S. PATENT DOCUMENTS

| | | | |
|---|---|---|---|
| 6,288,891 B1 * | 9/2001 | Hasegawa | F16M 11/10 361/679.22 |
| 9,277,659 B2 * | 3/2016 | Onda | F16M 11/046 |
| 9,541,963 B2 * | 1/2017 | Lin | G06F 1/1616 |
| 10,936,020 B2 * | 3/2021 | Chang | G06F 1/1692 |
| 11,216,042 B2 * | 1/2022 | Kanas | G06F 1/1618 |
| 2012/0217855 A1 * | 8/2012 | Chen | G06F 1/1624 312/323 |
| 2017/0090522 A1 * | 3/2017 | Lu | G06F 1/1679 |

* cited by examiner

*Primary Examiner* — Nidhi Thaker
(74) *Attorney, Agent, or Firm* — JCIPRNET

(57) ABSTRACT

A foldable electronic apparatus with an adjusting bracket includes a first body having a rail and steps disposed along the rail, a second body pivotally connected to the first body to pivot and be unfolded and folded relative thereto, a first supporting member having first and second ends opposite to each other, and a second supporting member having third end and fourth ends opposite to each other. The first end is pivotally connected to the first body. The second end is pivotally connected to the second supporting member and located between the third and fourth ends. The third end is movably coupled to the rail. The first and second supporting members and the second body form a linkage mechanism, so the first and second supporting members pivot relative to the first body. The steps limit the third end to generate a unique moving path on the rail.

11 Claims, 7 Drawing Sheets

FOLDABLE ELECTRONIC DEVICE WITH MULTI-STEP ADJUSTING BRACKET

CROSS-REFERENCE TO RELATED APPLICATION

This application claims the priority benefit of Taiwan application serial no. 110147890, filed on Dec. 21, 2021. The entirety of the above-mentioned patent application is hereby incorporated by reference herein and made a part of this specification.

BACKGROUND

Technical Field

The disclosure relates to a foldable electronic apparatus with a bracket, and in particular, relates to a foldable electronic apparatus with a multi-step adjusting bracket.

Description of Related Art

With the advancement of technology, under the trend of touch control, notebook computers have begun to emphasize the design of products based on touch functions on the screens. Under this trend, conventional notebook computers have been changed to be foldable or reversible in order to meet the users' preferences for products and to be widely applied.

At present, styluses are required to be used when the foldable or reversible notebook computers are used in the tablet mode. However, when a user uses a notebook computer of these types, since there is no support on the back of the touch panel, the user cannot use the touch panel at a large angle, or the user may experience poor stability when using the touch panel at an angle, and an obvious sense of shaking may be sensed by the user. In order to improve stability, when the notebook computers currently available on the market are to be used in the tablet mode, additional accessories are required to act as the back supports of the touch panels.

Therefore, how to allow a user to use a notebook computer at a large angle and improve the stability of use when the notebook computer is used at an angle without requiring any additional accessory and without affecting the existing internal stacking space design of the notebook computer is an important issue for manufacturers when pursuing practical and convenient structural design.

SUMMARY

The disclosure provides a foldable electronic apparatus with a multi-step adjusting bracket capable of providing a corresponding supporting effect in response to a folding state of the electronic apparatus.

The disclosure provides a foldable electronic apparatus with an adjusting bracket including a first body, a second body, a first supporting member, and a second supporting member. The first body has a rail and a plurality of steps disposed along the rail. The second body is pivotally connected to the first body to pivot and be unfolded and folded relative to the first body. The first supporting member has a first end and a second end opposite to each other, and the first end is pivotally connected to the first body. The second supporting member has a third end and a fourth end opposite to each other, the second end is pivotally connected to the second supporting member and is located between the third end and the fourth end, and the third end is movably coupled to the rail. The first supporting member, the second supporting member, and the second body form a linkage mechanism, such that the first supporting member and the second supporting member pivot and are unfolded and folded relative to the second body. The steps limit the third end to generate a unique moving path on the rail.

Based on the above, in the foldable electronic apparatus, in addition to the relative pivoting of the bodies through the pivotal connection between the bodies, the linkage mechanism formed by the first supporting member, the second supporting member, and one of the bodies is further applied to provide corresponding support corresponding to the flipped state of the other body.

In the embodiments, the pivotal connection and movably coupling among the first supporting member, the second supporting member, and the second body allow the first supporting member and the second supporting member to pivot relative to the second body and to be unfolded on the second body, so that under the normal use state of the foldable electronic apparatus, the first supporting member and the second supporting member may not only act as a supporting bracket of the second body, but also can support the first body corresponding to another use state which is generated when the first body is flipped relative to the second body. Further, the rail is provided with multiple steps, which further enables the third end of the second supporting member to temporarily stay at these steps. In turn, the second supporting member may be in various unfolded states relative to the second body, and the angle between the first body and the second body may be accordingly adjusted.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
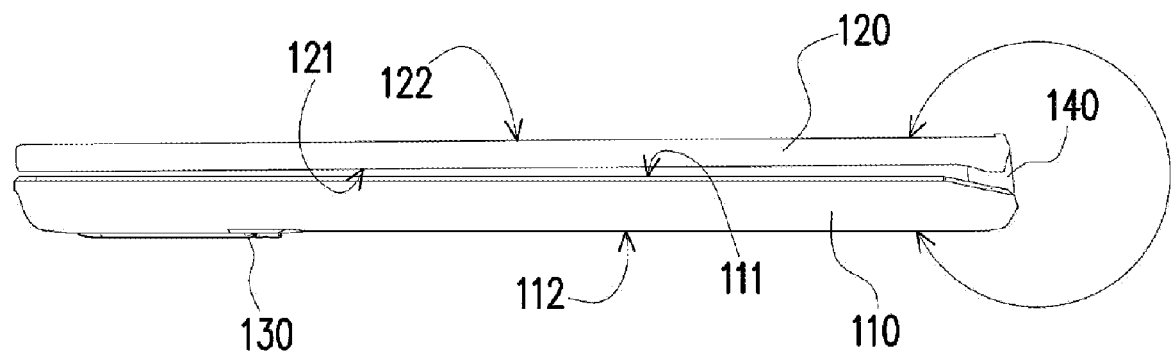
FIG. 1A is a schematic view of a foldable electronic apparatus according to an embodiment of the disclosure.
Figure 1B:
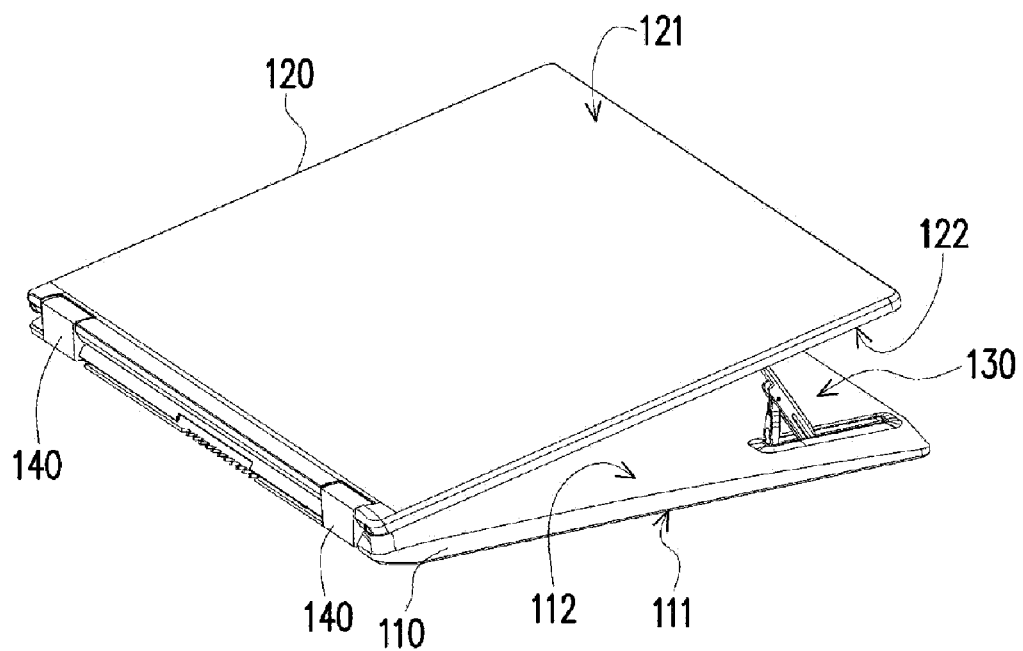
FIG. 1B is a schematic view of the foldable electronic apparatus of FIG. 1A in another state.
Figure 2:
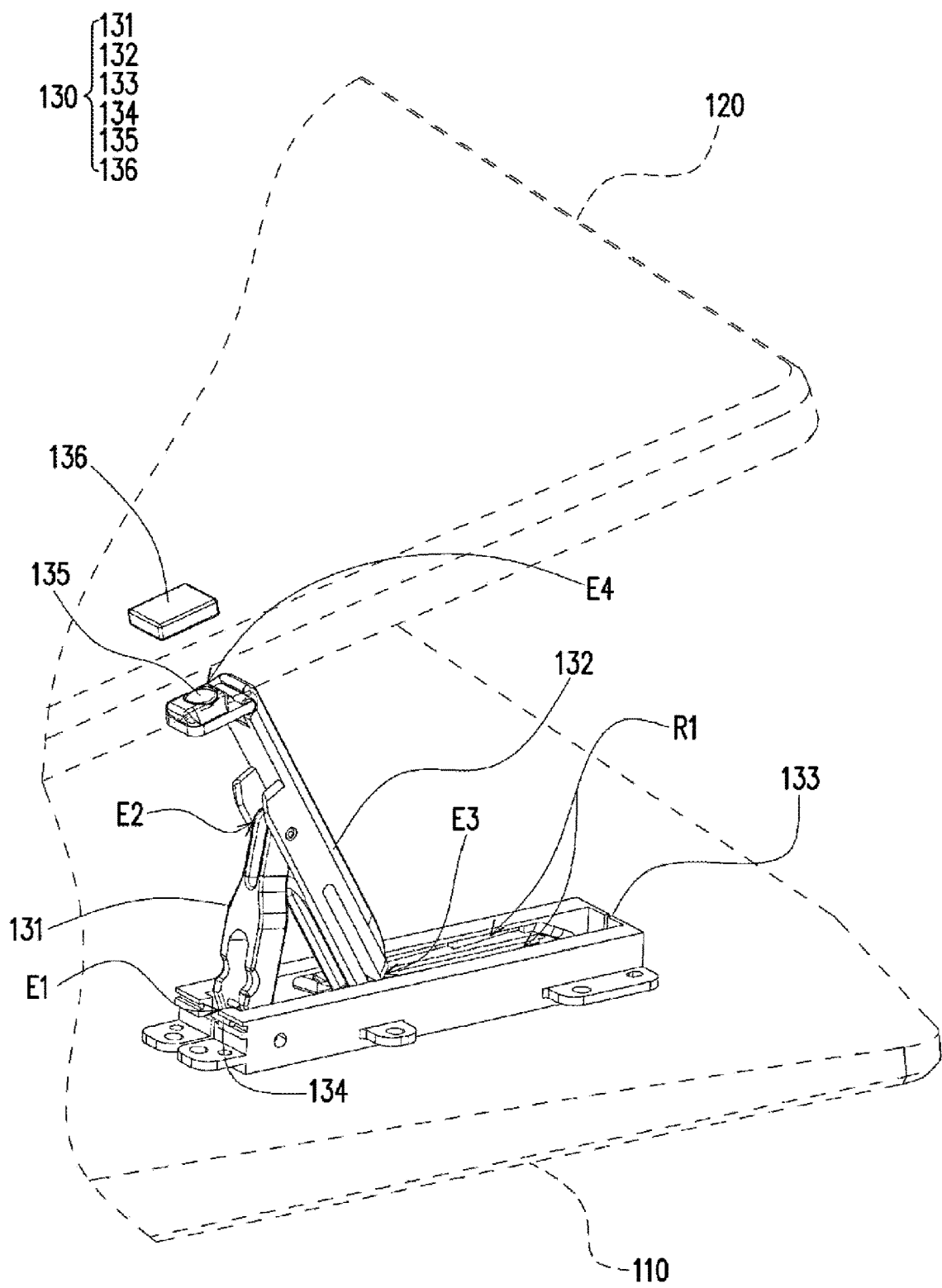
FIG. 2 is the foldable electronic apparatus of FIG. 1B illustrated in another form.

FIG. 1A is a schematic view of a foldable electronic apparatus according to an embodiment of the disclosure. FIG. 1B is a schematic view of the foldable electronic apparatus of FIG. 1A in another state. FIG. 2 is the foldable electronic apparatus of FIG. 1B illustrated in another form. With reference to FIG. 1A, FIG. 1B, and FIG. 2 together, in this embodiment, a foldable electronic apparatus with an adjusting bracket (hereinafter referred to as a foldable electronic apparatus 100), such as a notebook computer, includes a first body 110, a second body 120, a bracket mechanism 130, and a hinge 140. The first body 110 is, for example, a system host of the notebook computer and has an input surface 111 (for allowing a keyboard and a touch pad or related input modules to be arranged) and a second back surface 112. The input surface 111 and the second back surface 112 are opposite to each other, and the bracket mechanism 130 is operatively disposed on the second back surface 112. The second body 120 is, for example, a display screen (or touch screen) of the notebook computer and has a display surface 121 (or touch display surface) and a first back surface 122. The display surface 121 and the first back surface 122 are opposite to each other.

Further, the first body 110 and the second body 120 are connected to each other through the hinge 140 and may pivot and be unfolded and folded relative to each other accordingly, so that the foldable electronic apparatus 100 may be turned into a folded state as shown in FIG. 1A or a flipped state as shown in FIG. 1B through the pivoting of the bodies. The flipped state herein is different from a normal use state (not shown) of the notebook computer. Herein, the input surface 111 substantially covers a plane (platform) and may be treated as a tablet state, and the bracket mechanism 130 is supported between the first body 110 and the second body 120. In other words, in the folded state shown in FIG. 1A, the display surface 121 faces and overlaps the input surface 111, and the bracket mechanism 130 is housed in the first body 110. In the flipped state, the first back surface 122 faces the second back surface 112, and the bracket mechanism 130 extends out of the first body 110 to support the first back side 122 of the second body 120.

Figure 3:
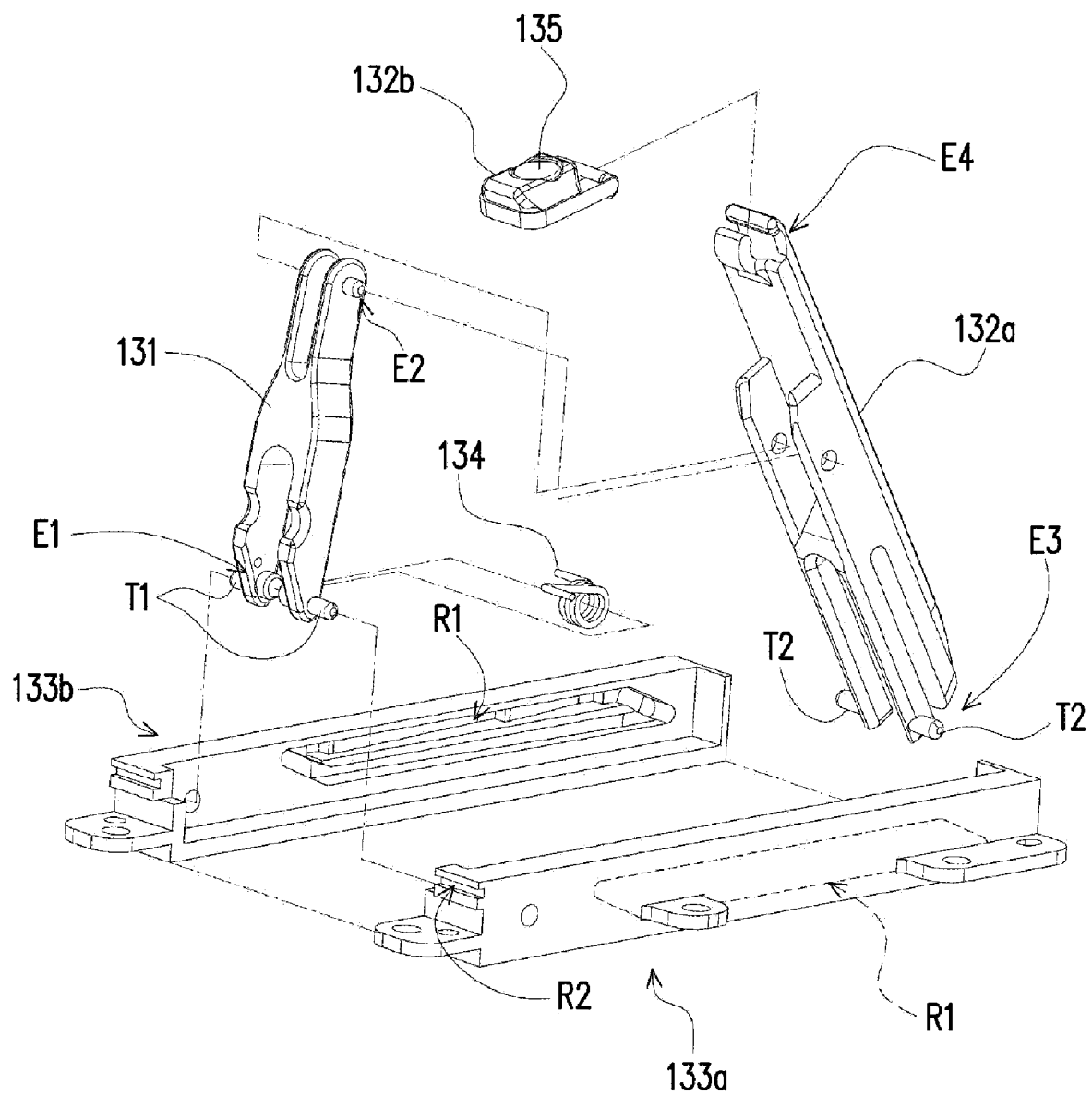
FIG. 3 is an exploded view of part of members of a bracket mechanism of FIG. 2.

FIG. 3 is an exploded view of part of members of a bracket mechanism of FIG. 2. With reference to FIG. 2 and FIG. 3 together, in this embodiment, the bracket mechanism 130 of the foldable electronic apparatus 100 includes a first supporting member 131, a second supporting member 132, a base 133, and a torsion spring 134. The base 133 is disposed in the first body 110 and has rails R1, and in other embodiments, the base 133 and the first body 110 may be formed as an integral structure. The first supporting member 131 has a first end E1 and a second end E2 opposite to each other, and the first end E1 is pivotally connected to the base 133 in the first body T1 through a pivot T1. The second supporting member 132 has a third end E3 and a fourth end E4 opposite to each other, the second end E2 is pivotally connected to the second supporting member 132 and is located between the third end E3 and the fourth end E4, and the third end E3 is movably coupled to the rails R1. Based on the above arrangement of the members, the first supporting member 131, the second supporting member 132, and the first body 110 form a linkage mechanism, such that the first supporting member 131 and the second supporting member 132 may pivot and be unfolded and folded relative to the first body 110.

Figure 4:
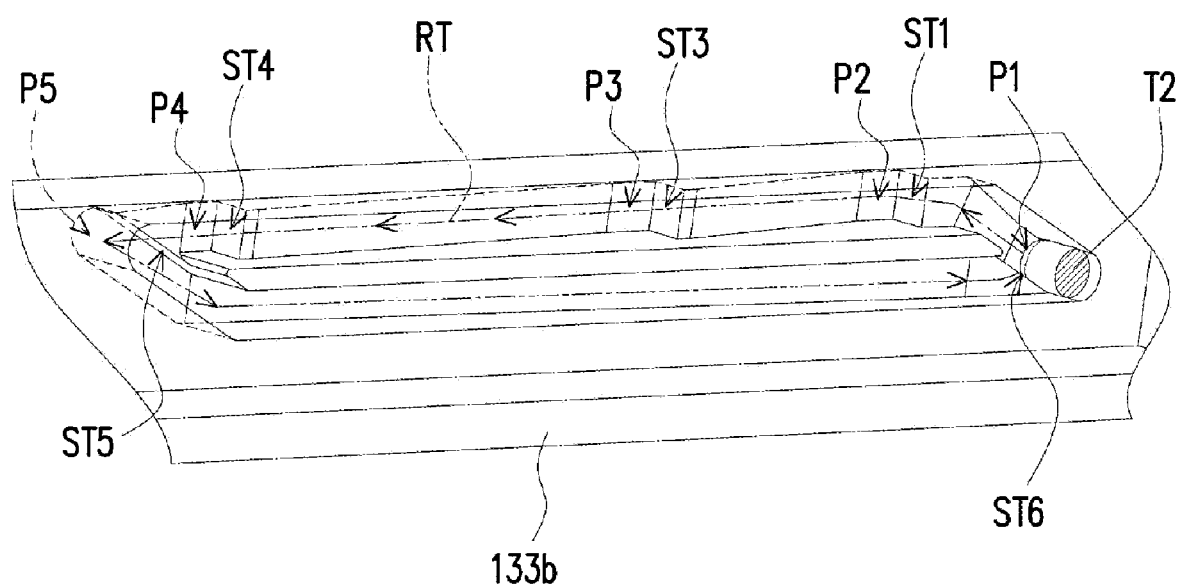
FIG. 4 is a local enlargement schematic view of a rail.

FIG. 4 is a local enlargement schematic view of a rail. With reference to FIG. 3 and FIG. 4 together, in this embodiment, the base 133 includes two components 133a and 133b abutting each other, each having a side wall and the rail R1 disposed on the side wall, and a recess is formed between the side walls. The third end E3 is submerged in the recess and is coupled to the rails R1 through guiding posts T2 disposed on the end portion E3. Here, the rail R1 located on the component 133a is only illustrated by a hidden line drawing its outer contour due to the viewing angle, detailed structure thereof is the same as the rail R1 on the component 133b, and the two are substantially mirrored. Here, the base 133 located in the first body 110 also has a plurality of steps ST1 to ST6 disposed along the rail R1, and these steps ST1 to ST6 limit the third end E3 to generate one moving path RT on the rail R1.

To be specific, as shown in FIG. 4, the rail R1 located on the component 133b together with the guiding post T2 located on the third end E3 of the second supporting member 132 are used herein to act as an example for illustration. In this embodiment, the rail R1 is a closed loop and may limit the moving path RT of the guiding post T2 moving thereon to be a unique moving path. That is, the moving path RT shown in FIG. 4 is a one-way loop path traveling in a counterclockwise direction, that is because a descending trend of a terrain of the steps ST1 to ST6 on the rail R1 is consistent with the moving path RT. In other words, in the counterclockwise direction, a terrain height of each step ST1 to ST6 reveals that the terrain height of the previous position is higher than the terrain height of the latter position. Taking the step ST1 as an example, when the guiding post T2 travels along the moving path RT, its terrain height before the step ST1 is higher than the terrain height of a position P2 (i.e., the position after the step ST1). As such, the guiding post T2 can only continue to move along the moving path RT and cannot return from the position P2 to a position P1 across the step ST1. The rest of the steps ST2 to ST6 also exhibit the same effects as described above, which in turn leads to the limitation effect of the aforementioned unique moving path RT.

Further, these steps ST1 to ST6 can drive the guiding post T2 to temporarily stay during its movement. Together with linking provided by the abovementioned linkage mechanism, these temporary staying effects may be reflected in that the first supporting member 131 and the second supporting member 132 can present a plurality of support states relative to the first body 110, and may be further reflected in a plurality of angles provided between the first body 110 and the second body 120, which may be described in detail in the following paragraphs.

Besides, with reference to FIG. 3 and FIG. 4 together, the torsion spring 134 of the bracket mechanism 130 is disposed on the first end E1 of the first supporting member 131 and abuts between the first supporting member 131 and the base 133 in the first body 110. In this embodiment, one end of the torsion spring 134 is inserted in the first end E1 of the first supporting member 131, and the other end is engaged with a groove R2 in the base 133, so that the torsion spring 134 may constantly drive the first supporting member 131 to be folded on the first body 110 accordingly. That is, corresponding to the rail R1, when the guiding post T2 of the second supporting member 132 is to be moved from the position P1 to a position P5, a user must apply a force to the bracket mechanism 130 to overcome an elastic force of the aforementioned torsion spring 134, and the bracket mechanism 130 may then be pulled out of the first body 110. In this way, after passing through the step ST1, ST2, or ST3, the guiding post T2 may temporarily stay at the position P2, P3, or P4 due to the elastic force of the torsion spring 134 (the user releases its force) and the engagement with the step ST1, ST2, or ST3.

Note that once the user continues to apply force to drive the guiding post T2 to move from the position P4 to the position P5, since the terrain from the position P5 along the moving path RT to the position P1 is downhill, the guiding post T2 is at the position P5. After the user releases the force, the torsion spring 134 may drive the second supporting 132 through the first supporting member 131 to allow the guiding post T2 to move from the position P5 to the position P1, and the guiding post T2 securely stays at the position P1 due to the step ST6. In other words, the abovementioned moving process of the guiding post T2 is equivalent to that the guiding post T2 at the third end E3 moves on the rail R1 to move closer to or away from the first end E1. When the third end E3 is located at a turning-back position (i.e., position P5) closest to the first end E1 of the rail R1, the torsion spring 134 drives the third end E3 of the second supporting member 132 through the first supporting member 131 to move to a starting position (i.e., position P1) where the rail R1 is farthest from the first end E1.

Figure 5A:
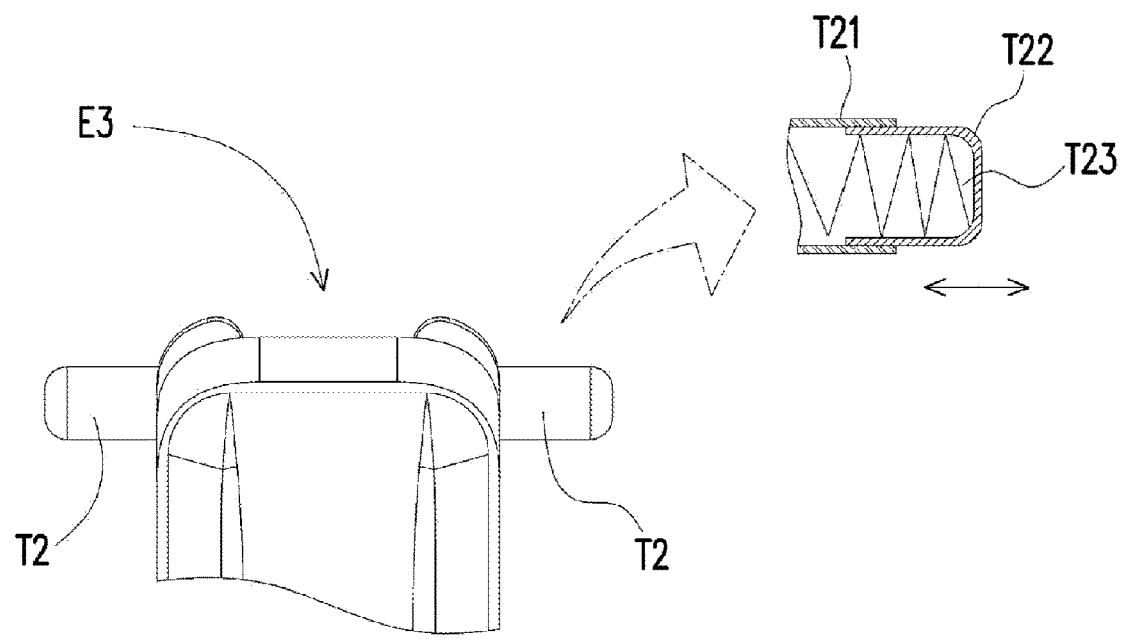
FIG. 5A is a local schematic view of a guiding post.
Figure 5B:
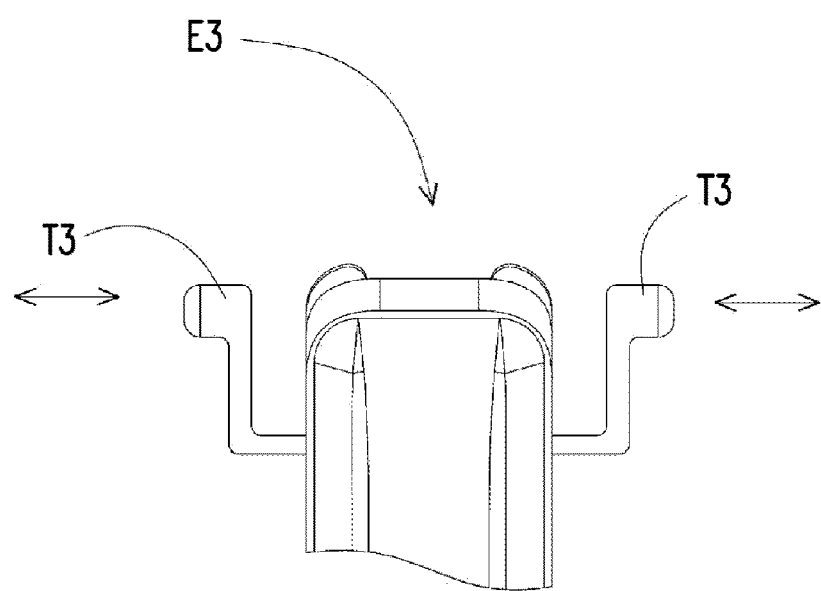
FIG. 5B is a local schematic view of a guiding post according to another embodiment of the disclosure.

FIG. 5A is a local schematic view of a guiding post. With reference to FIG. 5 together with FIG. 4, in view of the terrain change of the rail R1, in order to allow the third end E3 to move smoothly along the rail R1, the guiding post T2 of this embodiment needs to be telescopic. As shown in FIG. 5A, each of the guiding posts T2 includes a base portion T21, a moving portion T22, and an elastic member T23. The base portion T21 extends from the third end E3 of the second supporting member 132, and the moving portion T22 is connected to the base portion T21 through the elastic member T23. In this way, the moving portion T22 is in a floating state (the left right arrow shown in the figure, which represents movable directions of the moving portion T22), in response to the terrain change of the rail R1 accordingly. As shown in FIG. 4, on the moving path RT, the terrain of the rail R1 presents an ascending and descending staggering configuration FIG. 5B is a local schematic view of a guiding post according to another embodiment of the disclosure. With reference to FIG. 5B, different from the foregoing embodiments, a guiding post T3 of this embodiment is connected to the third end E3 of the second supporting member 132 in an elastic arm structure, which can also make the guiding post T3 telescopic when moving along the rail R1. In another embodiment that is not shown, the guiding post may also exhibit a pogo pin structure to produce the required telescopic effect.

Figure 6A:
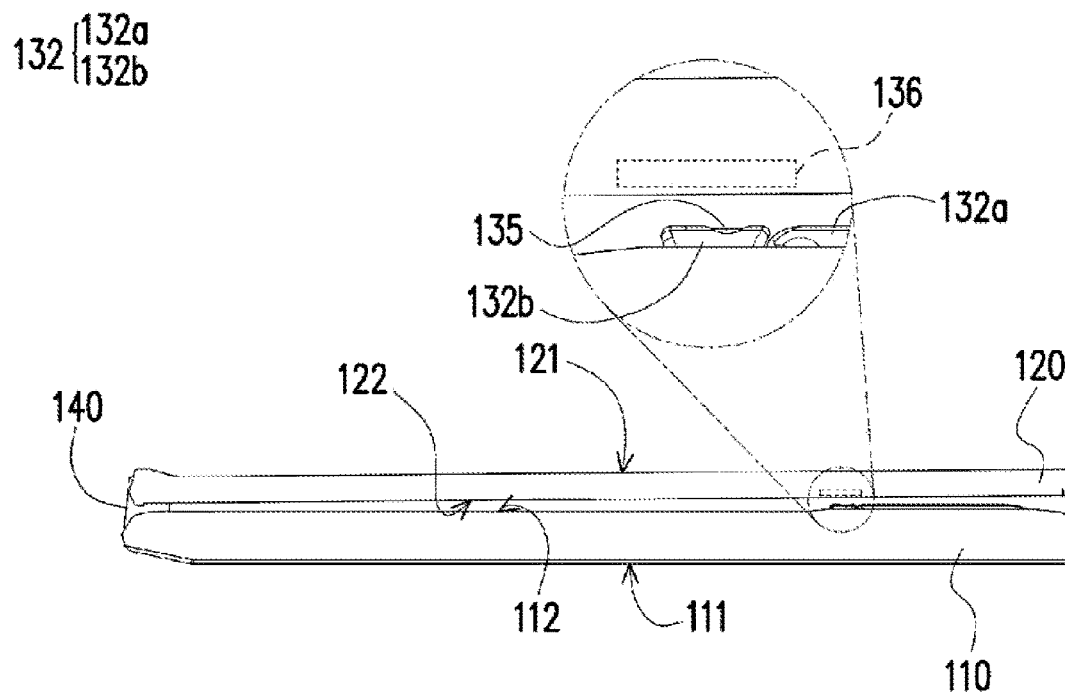
FIG. 6A to FIG. 6C illustrates a process of driving the bracket mechanism.
Figure 6B:
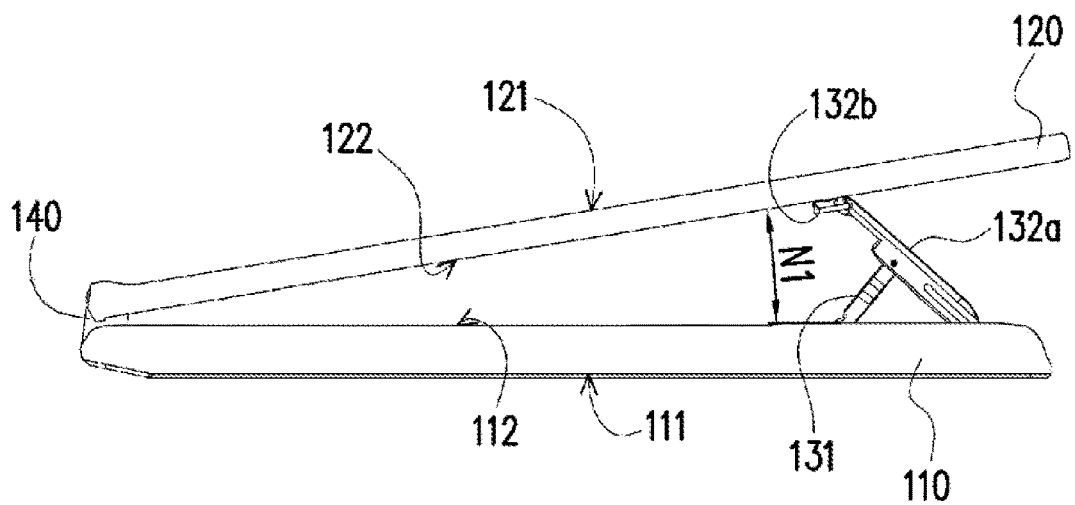
Figure 6C:
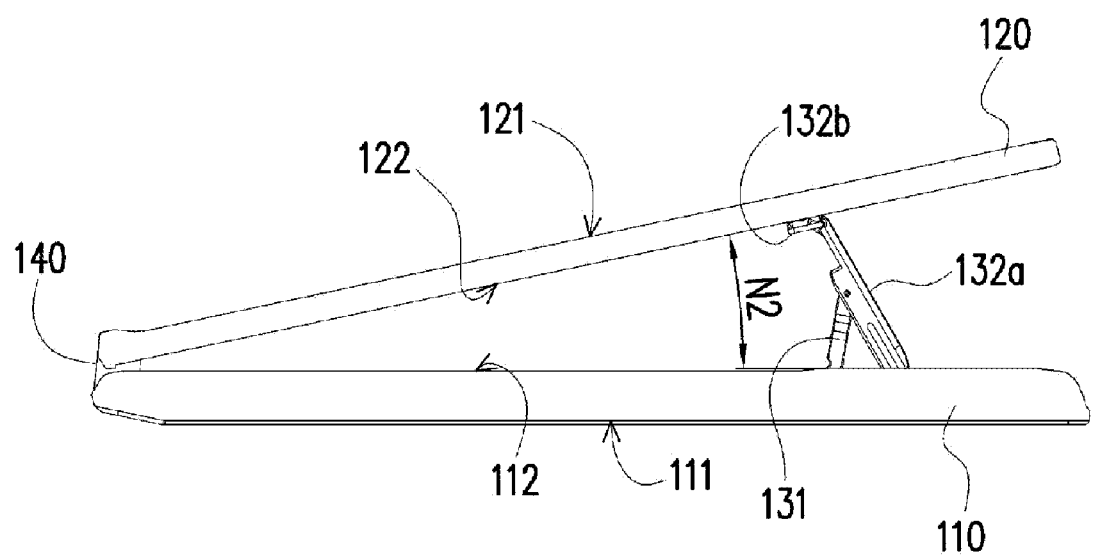

FIG. 6A to FIG. 6C illustrates a process of driving the bracket mechanism. With reference to FIG. 6A first together with FIG. 2 and FIG. 3, in this embodiment, the foldable electronic apparatus 100 further includes a magnetic coupling member formed by a pair of magnetic members 136 and 135 attracting each other and respectively disposed on the second body 120 and the fourth end E4 of the second supporting member 132. In detail, the second supporting member 132 of this embodiment includes a main member 132a and a secondary member 132b pivotally connected to each other. The main member 132a has the aforementioned third end E3 and the fourth end E4, the magnetic member 135 is disposed on the secondary member 132b, and the magnetic member 136 is disposed on the second body 120. Accordingly, when the second body 120 pivots relative to the first body 110 through the hinge 140 and substantially pivots to the state shown in FIG. 6A, the second body 120 may attract the magnetic member 135 on the secondary member 132b through the magnetic member 136 thereon, so as to accordingly drive the second supporting member 132 and link the first supporting member 131. The second body 120 may thereby be supported by the bracket mechanism 130. Further, with the temporary staying of the guiding post T2 caused by the steps ST1 to ST6, the angle between the first body 110 and the second body 120 in the flipped state may also be presented in multiple steps. As shown in FIG. 6A to FIG. 6B, as the guiding post T2 of the second supporting member 132 moves from the position P1 to the position P2, an angle N1 is provided between the bodies shown in FIG. 6B. As shown in FIG. 6B to FIG. 6C, as the guiding post T2 moves from the position P2 to the position P4, an angle N2 is provided between the bodies, and the angle N2 is greater than the angle N1.

In other words, through the bracket mechanism 130, the user is not only allowed to manually remove the first supporting member 131 or the second supporting member 132 from the first body 110 directly through the magnetic members 135 and 136, but is also provided with another operational manner as described above. That is, the driving mode in which the second body 120 pivots approximately 360 degrees relative to the first body 110 and then the related member is taken out from the first body 110 through the magnetic coupling member, which provides a labor-saving operation mode for the user.

Note that with reference to FIG. 4 and FIG. 6C together, when the guiding T2 post moves to the position P5 (i.e., in the state shown in FIG. 6C), the user further applies force to the second body 120 to increase the angle between the second body 120 and the first body 110 (so that this angle is greater than the angle N2 shown in FIG. 6C), which is equivalent to that in FIG. 6C, the user further applies force to drive the second body 120 to pivot in a counterclockwise direction until the guiding post T2 moves to the position P5.

In view of the foregoing, in the embodiments of the disclosure, in the foldable electronic apparatus, in addition to the relative pivoting of the bodies through the pivotal connection between the bodies, the linkage mechanism formed by the first supporting member, the second supporting member, and one of the bodies is further applied to provide corresponding support corresponding to the flipped state of the other body.

In the embodiments, the pivotal connection and movably coupling among the first supporting member, the second supporting member, and the second body allow the first supporting member and the second supporting member to pivot relative to the second body and to be unfolded on the second body, so that under the normal use state of the foldable electronic apparatus, the first supporting member and the second supporting member may not only act as a supporting bracket of the second body, but also can support the first body corresponding to another use state which is generated when the first body is flipped relative to the second body.

Further, the bracket mechanism is provided with the magnetic coupling member. One magnetic member is disposed on the second supporting member, and the other magnetic member is disposed on the second body. As such, when the second body pivots to the 360-degree flipped state relative to the first body, the second supporting member may be pulled out from the first body through the magnetic attraction effect of the magnetic coupling member. In this way, in addition to allowing the user to manually pull out the bracket mechanism from the first body, the bracket mechanism may also be pulled out through the abovementioned operational manner, which provides a labor-saving effect.

Further, each rail is provided with multiple steps, which further enables the third end of the second supporting member to temporarily stay at these steps. As such, after the second supporting member is pulled out from the second body through the abovementioned manners, various unfolded states may be generated relative to the first body through these steps, and multi-step adjustment is thereby achieved, and the angle between the first body and the second body is adjusted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A foldable electronic apparatus with an adjusting bracket, comprising: a first body, having at least one rail and a plurality of steps disposed along the at least one rail; a second body, pivotally connected to the first body to pivot and be unfolded and folded relative to the first body; a first supporting member, having a first end and a second end opposite to each other, wherein the first end is pivotally connected to the first body; and a second supporting member, having a third end and a fourth end opposite to each other, wherein the second end is pivotally connected to the second supporting member and is located between the third end and the fourth end, and the third end is movably coupled to the at least one rail, wherein the first supporting member, the second supporting member, and the first body form a linkage mechanism such that the first supporting member and the second supporting member pivot and are unfolded and folded relative to the first body, wherein the steps limit the third end to generate a unique moving path on the at least one rail, wherein the at least one rail is a closed loop, the unique moving path is a one-way loop path, and a descending trend of the steps is consistent with the one-way loop path.

2. The foldable electronic apparatus with the adjusting bracket according to claim 1, wherein the second body has a display surface and a first back surface opposite to each other, the first body has an input surface and a second back surface opposite to each other, the first supporting member and the second supporting member are disposed on the second back surface, the display surface faces and overlaps the input surface and the first supporting member and the second supporting member are housed in the first body in a folded state, and the first back surface faces the second back surface and the first supporting member and the second supporting member extend out of the second back surface in a flipped state such that the first supporting member abuts against the first back surface.

3. The foldable electronic apparatus with the adjusting bracket according to claim 2, wherein the steps drive movement of the third end on the at least one rail to form a plurality of pause positions and form a plurality of states in which the first supporting member abuts against the second body, such that the second body generates a plurality of angles relative to the first body.

4. The foldable electronic apparatus with the adjusting bracket according to claim 1, further comprising a base disposed on the first body, wherein the base has two side walls opposite to each other, a recess formed by the two side walls, and two of the at least one rail individually located on the two side walls, and the third end is submerged in the recess and is coupled to the two rails.

5. The foldable electronic apparatus with the adjusting bracket according to claim 4, wherein the second supporting member further comprises two guiding posts telescopically disposed on the third end to be suitable to a terrain of the rails.

6. The foldable electronic apparatus with the adjusting bracket according to claim 5, wherein the guiding posts are connected to the third end through springs.

7. The foldable electronic apparatus with the adjusting bracket according to claim 5, wherein the guiding posts are connected to the third end through elastic arms.

8. The foldable electronic apparatus with the adjusting bracket according to claim 1, further comprising a torsion spring abutting between the first supporting member and the first body, wherein the torsion spring constantly drives the first supporting member to be folded on the first body.

9. The foldable electronic apparatus with the adjusting bracket according to claim 8, wherein the third end moves on the at least one rail to move close to or away from the first end, and the torsion spring drives the third end of the second supporting member to move to a starting position where the at least one rail is furthest away from the first end through the first supporting member when the third end is located at a turning-back position of the at least one rail most adjacent to the first end.

10. The foldable electronic apparatus with the adjusting bracket according to claim 9, wherein the first supporting member and the second supporting member are folded and are housed in the first body when the third end is located at the starting position.

11. The foldable electronic apparatus with the adjusting bracket according to claim 1, further comprising a magnetic coupling member, disposed on the second body and the fourth end of the second supporting member, such that the second body drives the first supporting member and the second supporting member to pivot relative to the first body to move out of the first body through the magnetic coupling member when the second body pivots to a flipped state relative to the first body and approaches the first body.

* * * * *